United States Patent Office 3,519,574
Patented July 7, 1970

3,519,574
PROCESS FOR MANUFACTURE OF CATALYST MATERIAL AND CATALYST MATERIAL PRODUCED THEREBY
Joseph Dennis Colgan, Stamford, Conn., assignor to American Cyanamid Company, Stamford, Conn., a corporation of Connecticut
No Drawing. Filed July 10, 1967, Ser. No. 652,019
Int. Cl. B01j *11/36, 11/40*
U.S. Cl. 252—451
10 Claims

ABSTRACT OF THE DISCLOSURE

This invention relates to a process for preparing catalyst material which comprises preparing a slurry of an inorganic oxide gel, typically an alumina-coated silica-alumina hydrogel, adding a petroleum fraction having a boiling range between about 300 and 950° F. to said slurry to form an oil-in-water emulsion, subjecting said emulsion to sufficient shearing action to eliminate the fluidizing effect of the continuous water phase thereby stiffening the hydrogel, extruding the stiffened hydrogel through an orifice of from $\frac{1}{16}$ to $\frac{1}{2}$ inch in diameter, and drying and calcining said extrudates. The resulting formed catalyst materials have improved strength and other physical properties.

---

This invention relates to a process for preparing catalyst material, i.e., catalyst supports or base material or final catalysts. More particularly, the present invention relates to a process for preparing formed catalyst materials and in particular extrudates from inorganic oxide hydrogels which extrudates when dried and calcined are characterized by high porsity of controlled variability, increased surface area and good mechanical strength.

Inorganic metal oxides are widely used as a base in the formation of catalyst materials. Numerous processes are known for the preparation of catalysts and catalyst supports from hydrosols and gels of inorganic metal oxides. Depending upon the type of hydrosol or gel employed as well as the intended utility of the catalyst formed, however, the process of catalyst formation may differ widely, leading to important distinctions in the final catalyst, which distinctions relate to the process of preparation. Thus, a particular process for preparation of a catalyst from a specific metal oxide hydrosol may lead to distinctive utility for such a catalyst, while the employment of alternative processes with the same hydrosol as well as the employment of the same process with hydrogels of the same or different metal oxides may not achieve catalysts of the same utility.

In U.S. Pat. 3,067,128 there is disclosed a process for producing an absorbent of high surface area, high porosity, and a multiplicity of pores of enlarged diameter which comprises the formation of a metal oxide hydrosol, emulsifying a larger volume of said hydrosol with a smaller volume of hydrocarbon oil to form an oil-in-water emulsion, effecting gelation of said emulsion to form a hydrogel having oil droplets trapped therein, and thereafter removing the water and oil droplets therefrom. The absorbent thus produced is in the form of small particles, is of low mechanical strength, and is not suitable for use in fluidized catalyst operations due to its tendencies to be further reduced in size by attrition and form extremely fine particles which interfere in said use.

Any attempt to form said particles into larger structures such as by compressing, compacting, tabletizing, etc., would have an adverse effect on the porosity, surface area, pore size, the attainment of which the process of preparation is specifically directed. Thus, the process of the cited patent provides a particulate absorbent of specific properties from an inorganic metal oxide hydrosol, but does not provide for extrudates having such specific properties.

In copending application Ser. No. 344,842, filed Feb. 14, 1964 and now Pat. No. 3,390,100, there is disclosed a process for producing extrudates of metal oxides in the form of hydrogels, which extrudates when dried and calcined are suitable for use as or in the preparation of formed catalyst materials. The process described, however, provides catalyst materials having a limited range of surface area and porosity with adequate mechanical strength.

There is needed, therefore, an improved process for the production of catalyst materials from inorganic metal oxides whereby said materials are obtained as formed catalyst materials of increased surface area and porosity and good mechanical strength.

Accordingly, it is an object of this invention to provide a process for forming extrudates of an inorganic oxide hydrogel and mixed inorganic oxide hydrogels such as alumina-coated silica hydrogels useful as formed catalyst materials whereby increased surfaces area, higher porosity of controlled variability, and good mechanical strength is readily achieved.

It is a further object of this invention to provide a process for the production of said extrudates, said process enabling fine particles of catalyst materials resulting from previous preparations to be employed therein and thus be recovered.

It is a further object of this invention to improve the sturctural properties of extrudates of larger diameter.

These and other objects of the present invention will become apparent from a consideration of the ensuing description.

It has now been discovered that by incorporating suitable petroleum fractions into a slurry of an inorganic metal oxide hydrogel such as an alumina-coated silica hydrogel, optionally containing fines from previously prepared catalyst material, subjecting said mixture to a shearing action sufficient to eliminate the fluidizng effect of the continuous water phase thereby stiffening the hydrogel, extruding the stiffened hydrogel through a suitable orifice, and subsequently drying and calcining the extrudate, there is obtained a formed catalyst material having improved properties such as increased surface area, higher porosity of controlled variability as to size, and good mechanical strength.

It has also been found that the optional addition of fines to the hydrogel slurry is not detrimental to the properties of the formed catalyst materials and that calcined extrudates of larger diameter and higher mechanical strength than previously attainable may be readily obtained.

It is surprising that the use of appropriate petroleum fractions with pre-formed hydrogels should effect increases in surface area and porosity in the extrudates in view of the prior art teachings that the procedures employing such fractions required their addition to hydrosols prior to the formation of hydrogels therefrom.

Further, in increasing the use level of effective petroleum fractions in the process of the present invention, it is highly surprising and totally unexpected that the mechanical strength values of the calcined extrudates should first decrease somewhat, then go through a point of inflection, and finally increase with increasing usage of said fraction. Still further, it is surprising that fines representing dried and calcined gels resulting from previous preparations of catalyst materials can be incorporated into the hydrogel slurry employed in the process of the present invention.

In the description of the present invention, the terms "hydrosol" and "hydrogel" are frequently employed. In order to indicate specifically what is meant by each of the terms in this specification, the following definitions are given.

A "hydrosol" is a colloidal dispersion of solution in water of a metal oxide, the particles of which are submicroscopic and less than 0.2 micron in diameter and usually in the range of about several hundred to several Angstrom units, the composition being homogeneous and retaining true fluid characteristics.

A "hydrogel," on the other hand, contains macroscopically visible particles which result from precipitation, coagulation, gelation, or flocculation of hydrosols whereby the particle size is increased greatly over that in the hydrosol and the composition resulting contains at least some material in the semi-solid state. Hydrogels are also distinguished from "gels" in that they are not dried and contain free water.

The preparation of inorganic metal oxide hydrogels is a well established art. By term "inorganic metal oxide hydrogel" as it is employed herein, it is meant the oxides of silica, alumina, magnesia, zirconia and the like, or their equivalents including mixtures thereof such as silica-alumina hydrogels illustratively silica hydrogels or hydrated silica gels may be prepared by precipitating silica from an alkali metal silicate with a material such as sulfuric acid under appropriate conditions of pH, temperature, agitation and the like known to those skilled in the art.

Alumina hydrogels may be prepared by precipitation from a water solution of a water-soluble aluminum compound which may be either an aluminum salt, such as aluminum sulfate, aluminum nitrate, aluminum chloride and the like, or an alkali metal aluminate, such as sodium or potassium aluminate or both. Thus alumina hydrogels may be prepared as specifically modified by the procedures set forth in U.S. Pats. Nos. 3,032,514 and 3,086,845, among others.

The preferred alumina-coated silica hydrogels of the present invention are formed by first preparing a silica hydrogel in accordance with the procedure given therefor and subsequently preparing an alumina hydrogel in lesser amount in the same preparative medium. The amount of alumina hydrogel present may constitute from about 5 to about 40%, preferably 10 to 30%, based on the weight of the total silica-alumina.

After formation of the hydrogel, it is generally preferable to separate the hydrogel from excess medium, if necessary, and wash the separated gel to remove undesired ions which may be present. However, the washing may be delayed until after the catalyst is formed. The hydrogel as formed, therefore, may be useful in the present invention without further modification.

The hydrogel obtained is adjusted, if necessary, to a solids content of between about 4 and 10% by weight of the total, the solids being that obtained upon drying and calcining the hydrogel. The hydrogel is then agitated to produce a slurry. To this slurry, if desired, may be added promoters or components from which promoters are formed. Such addition may be in the form of aqueous solution or dispersion. If fines are to be employed in the catalyst preparation, they are added in desired amount at this time also. Fines may be utilized in amounts up to about 25% of the total catalyst calcined weight. A preferred usage is about 10 to 15% on the same basis.

Regardless of whether or not provision is made for promoters at this time or for fines, there is next added a suitable quantity of a useful petroleum fraction containing a sufficient quantity of a dispersant to form an oil-in-water emulsion of the petroleum fraction in the aqueous slurry. Formation of the emulsion may be concomitant to the addition or may be effected in a subsequent step. When concomitant, suitable agitation is provided to effect the desired emulsification.

Suitable petroleum fractions include those having a boiling range between about 300 and 950° F. Such fractions include kerosene, boiling range 302 to 570° F., fuel oil, boil range 400 to 625° F., gas oil, boiling range 450 to 800° F., mineral oil, boiling range 620 to 930° F., etc. Certain other petroleum fractions resulting from more extensive fractionation of these or other common petroleum fractions may be used as long as the restrictions as to the boiling range are met. Other petroleum fractions that are of higher volatility, i.e., lower boiling range, are not useful in that they do not produce the desired increases in pore volume. Other fractions that are of lower volatility are readily exuded from the shrinking extrudate during drying and calcining and minimize strength of the extrudate and result in the production of excessive fines. In the latter case the fines result from attrition during drying and calcining.

The amount of petroleum fraction that may be employed will vary widely, depending upon the nature of the modifications of surface area, pore volume, etc., desired in the final catalyst material. A particularly useful range encompasses from about 0.1 to 1.2 parts by weight of petroleum fraction per part of hydrogel solids by weight. An increase in surface area will be effected in the catalyst material by the addition of petroleum fraction and will be greater as the usage thereof is increased. At usages of petroleum fraction of about 0.1 part per part of hydrogel solids, increases in microporosity are primarily observed. Above this usage and up to about 0.6 part on the same basis, increases in macroporosity are primarily observed. Increasing the usage above about 0.6 part again results primarily in increases in microporosity. As the usage of petroleum fraction is increased in the range of about 0.1 to 0.6 part on the basis indicated, there is a gradual diminution of crush strength of the catalyst material formed. In the range of about 0.6 to 0.8 part on the same basis, there appears an inflection point in the crush strength such that at this level of usage crush strength, although adequate for most formed catalyst usage is minimal. Increasing the usage of petroleum fraction above about 0.8 part on the same basis, there is a gradual increase in crush strength from the minimal value. Such behavior with respect to crush strength is surprising and unpredictable.

The dispersant that may be used in conjunction with the petroleum fraction is one that is capable of forming the desired oil-in-water emulsion therewith in the hydrogel slurry. It may be appreciated that in certain instances because of the presence of particular ion species, dispersants of opposing ionic form may not be appropriate because of possible interactions. This will be particularly true where components used to form promoters are present as well as when the hydrogel is not washed prior to contact with dispersant. However, although either cationic or anionic dispersants may be employed in appropriate cases, it is generally preferred to employ nonionic dispersants and thus avoid interaction possibilities in all cases. The number and types of nonionic dispersants are extensive and well-known. A listing thereof is given, for example, in the annual report entitled "Detergents and Emulsifiers," published by John W. McCutcheon, Inc. Generally, any of the nonionic dispersants listed in the current edition of this report are suitable, although the effective use level may vary. The report cited will also indicate effective cationic and anionic dispersants that may be used in appropriate cases. In most instances, a use level of about 1% by weight based on the weight of petroleum fraction is effective and preferred. Although it is generally preferred to have the dispersant dissolve in the petroleum fraction prior to its addition to the slurry, this is not a necessary restriction. Alternatively, the dispersant may be dissolved in the water phase of the slurry, where soluble, prior to the addition of the petroleum fraction.

While is it possible to add the dispersant and petroleum fraction to the hydrogel slurry in such a manner that an emulsion is formed during or immediately following such addition, it is also possible to forego special efforts at this point to produce the emulsion. The subsequent step in the process involves shearing action which normally will effect emulsion or improve that formed.

Following the addition of petroleum fraction and dispersant, the hydrogel slurry is next subjected to sufficient shearing action to eliminate the fluidizing action of the continuous water phase. This shearing action converts the pumpable flowable hydrogel slurry into a semi-rigid material without substantially changing solids content of the slurry, apparently as a result of the redistribution of its free water content, which water is thought to be primarily responsible for its fluidity. It is thought that the shearing of individual gel particles creates a greater external surface area which by surface tension forces as well as capillary attraction forces manages to fix the water, including the petroleum fraction content, within a network of the gel-water system. As noted, the shearing action produces substantially no change in composition between total liquid content including petroleum fraction, and total solids. The shearing action is believed to modify the network of the gel and its change in rigidity as a result of the redistribution of water-petroleum fraction content.

The shearing or comminution of the hydrogen particles in the slurry may be conveniently accomplished by passing the slurry through a homogenizer, as for example, an ordinary spring-pressed or spring-loaded homogenizing valve. The extent of shearing or comminution my be defined numerically as that degree corresponding to the homogenization obtained by passing the hydrogel slurry through such a valve at a defined pressure drop. This degree of shear will normally be produced by a pressure drop of at least 500 pounds per square inch, and preferably at least 1500 pounds per square inch, on an ordinary spring-loaded homogenizer, as for example, a Mantin-Gaulin 1500 gallons per hour 4000 p.s.i. MC Series homogenizer.

After subjection of the hydrogel slurry to the shearing action, the stiffened hydrogel is then readily extruded as through an orifice of from $\frac{1}{16}$ to $\frac{1}{2}$ inch diameter. Depending upon the size of the formed catalyst material desired, an appropriate orifice diameter is selected and the extrusion effected according to conventional procedures. After extrusion, the extrudates are dried and calcined to form the catalyst material desired.

Drying is generally at temperatures in the range of 150–350° F. It is preferably carried out by staged drying techniques to minimize the production of fines, especially when the higher boiling petroleum fractions are employed. According to this drying technique, the total volatile content is removed in portions, each portion in a separate drying step, in contrast to a continuous drying operation, wherein all of the volatiles are removed in a single step. The aspect of staged drying is more critical than the temperature of the actual drying. It is generally preferred that an initial drying step or stage be conducted in such a manner as to double the initial solids content. One or more additional steps or stages may then be employed to remove remaining volatiles.

After drying calcination is accomplished in conventional manner at temperatures up to about 1100–1200° F. for time periods of up to about an hour, during which the metal oxides are activated. After calcination, where necessary, the catalyst materials may be washed to remove undesirable ions and contaminants.

It is to be appreciated that the catalyst materials of the present invention may have promoters present, introduced in the catalyst slurry as previously described. Alternatively, the calcined extrudates may be impregnated therewith in accordance with procedures well-known to those skilled in the art. The presence of promoters in the hydrogel slurry does not significantly effect subsequent processing steps in the preparation of the catalyst materials of this invention.

The catalyst materials of the present invention may be used as cracking catalysts for fixed or moving beds. In addition, the catalyst materials may contain special promoters to provide formed catalyst useful for effecting particular reactions, such as isomerization, hydrogenation, reforming, hydrocracking, hydrodesulfurization of petroleum hydrocarbons and the like. The improvements in physical properties of the structured catalysts obtained by the process of the present invention are especially helpful in providing extra space for the promoters within the structured catalyst without significant loss of activity due to diminution of absorbency because of the presence of promoter. Additionally, the increased area provided in the catalyst materials of the present invention eminently qualifies them for use in those processes wherein dispersed solids are present in the participating reactants.

Depending upon the particular reaction involved, the nature of the promoter employed may vary widely. In certain cases metals and metal oxides, alone or in combination, are appropriate. The metals involved include Group I–B metals, such as copper, silver, and the like; Group V–B metals such as vanadium and the like; Group V–III metals, such as platinum, palladium, rhodium, nickel, cobalt, and the like; transition metal oxides of Group V–I metals such as chromium, molybdenum, tungsten, and the like; and others. Halogens are also promoters in certain instances, particularly chlorine and fluorine. As is well-known, promoters of the general type described above are present in the final catalyst composition in amounts to render them suitable for the particular end use contemplated. In general, a promoter or combination of promoters may constitute amounts of from about 0.01 to 20.0% by weight of the final catalyst composition.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

In the following examples reference is made to physical properties such as pore volume, surface area and the like. In general, these are determined in accordance with the procedures described in the booklet "Test Methods for Synthetic Fluid Cracking Catalyst," published by American Cyanamid Company, January, 1957, and widely distributed in the field. An additional test not given in this booklet is crush strength. This value is determined by placing an extrudate on its side between two parallel plates. Force is applied to the top plate by means of pneumatic pressure until the extrudate is crushed. The device is such that the air pressure in pounds to cause crushing is the crush strength of the extrudate.

EXAMPLE 1

To an agitated tank, 210 parts of sodium silicate having the composition 8.90% $Na_2O$ and 28.70% $SiO_2$ and the balance water were added with 1050 parts of water and the temperature was brought to 114° F. A 25% sulfuric acid solution was then added over a five minute interval bringing the pH from 11.1 to 9.3 at which level a silica hydrogel was formed. The gel was aged for five minutes at pH 9.3 with the temperatures at 120° F., and then additional 25% sulfuric acid was added to reduce the pH to 4.0. To this gel was added 158.5 parts of aluminum sulfate solution (6% $Al_2O_3$) reducing the pH to 2.9. Sodium aluminate solution (29.5% $Al_2O_3$) was then added over a twenty minute period bringing the pH to 4.9 and depositing an alumina precipitate on the silica gel.

The alumina-coated silica gel was filtered and washed with approximately 4½ displacements of water. The filter cake was reslurried with an equal weight of water, adjusted with $NH_4OH$ to pH 5.0, and filtered and washed with approximately 4 displacements of water. The recovered filter cake was again reslurried with an equal weight of water, and the pH was adjusted to 7.9 by the addition of $NH_4OH$. The slurry was filtered and washed a third time with approximately 3½ displacements of water. The recovered filter cake had the following analysis:

| | Percent |
|---|---|
| Loss on ignition | 92.0 |
| Na₂O (dry basis) | 0.038 |
| SO₄ (dry basis) | 0.44 |

The above described filter cake was slurried with water to reduce the viscosity; the solids level was decreased from 8.0 to 5.95% and the pH was 7.7.

A solution of 2.32 parts of nickel nitrate hexahydrate, 0.483 part of ammonium metatungstate, and 0.92 part of ammonium fluoride in 58 parts of water was added to 168 parts of the 5.95% slurry described above. The blend was mixed for two hours, filtered and washed with approximately 2½ displacements of water.

A portion of the recovered filter cake was reslurried at 6.9% solids. This slurry was formed into extrudates by pumping it through a homogenizing valve of a Mantin-Gaulin homogenizer of the type referred to above at 3000 pounds per square inch (p.s.i.) and thence through nozzles, each with a 0.152 inch diameter orifice. The extrudates were collected, dried at 150° F. and calcined in a muffle furnace at 1100° F. The properties of the calcined particles are given in Table I.

EXAMPLE 2

The procedure of Example 1 was followed in every material detail up to the point where the reslurried filter cake was formed into extrudates. At this point the following procedure was followed.

To 80 parts of the reslurried filter cake was added 2.08 parts of kerosene which contained 1% by weight thereof of a surfactant, which is the reaction product of 9.5 moles of ethylene oxide with 1 mole of nonyl phenol. The mixture was vigorously agitated and formed into strands as in Example 1. The properties of the calcined particles are given in Table I.

A comparison of the properties of the extrudates of Examples 1 and 2 reveals the increases in pore volume, micropore volume, and surface area that result from the process of the present invention as typified by Example 2. Example 1 typifies the process of the copending application identified supra. It should be noted that the catalyst composition of U.S. Pat. No. 3,067,128 is not capable of being extruded and thus cannot be compared.

EXAMPLE 3

To an agitated tank, 15,000 parts of water and 2,600 parts of sodium silicate of Example 1 were added, and the temperature was adjusted to 82° F. A 25% sulfuric acid solution was then added over a seven minute period bringing the pH from 11.0 to 9.5. The silica gel produced at this pH was aged for 3 minutes and then additional 25% sulfuric acid was added reducing the pH to 3.0, the temperature being 90° F. The silica gel at this pH was then discharged into a second agitated tank to which 1200 parts of aluminum sulfate solution (7% Al₂O₃) was also added. A sodium aluminate solution (28% Al₂O₃) was then slowly added bringing the pH of the mixture up to 4.5. This addition was made in a period of 25 minutes and caused precipitation of alumina on the silica gel.

The alumina-coated silica gel was then processed through three stages of filtration and washing to remove sodium and sulfate ions.

The washed slurry was then blended with a water solution of nickel nitrate hexahydrate, ammonium metatungstate, and ammonium fluoride (solution content 0.93% Ni, 0.79% F, and 0.59% W), aged for two hours, and subjected to a fourth filtration and washing operation.

A portion of the filter cake recovered was then processed to extrudates as in Example 1. Properties of the calcined extrudates are given in Table II.

EXAMPLE 4

A 100 part portion (8.8% solids on dry basis) of the filter cake obtained in Example 3 prior to extrudation was vigorously mixed with 2.54 parts of kerosene containing 1% of the same surfactant as employed in Example 2. The kerosene modified slurry was processed to extrudates as in Example 1. Properties of the extrudates are given in Table II.

EXAMPLE 5

A second 100 part portion of the filter cake obtained in Example 3 prior to contact with the metal salts was mixed with a solution of 0.545 part of nickel nitrate hexahydrate, 0.171 part of ammonium fluoride, and 0.091 part of ammonium metatungstate in 14 parts of water. The mixture was aged for two hours and filtered. The filter cake was then mixed with kerosene containing surfactant as in Example 4. The kerosene-modified mixture was then processed into extrudates as in Example 1. Properties of the extrudates are given in Table II.

TABLE II

| Example | Pore volume, cc./gm. | Compacted Bulk density gm./cc. | Crush strength, lbs. | Surface area, m.²/gm. | Micro pore volume, cc./gm. | Percent Ni | W | F |
|---|---|---|---|---|---|---|---|---|
| 3 | .345 | .815 | 52.1 | 273 | 0.30 | 4.8 | 3.1 | 3.4 |
| 4 | .525 | .65 | 15.4 | 315 | 0.36 | 4.8 | 3.1 | 3.4 |
| 5 | .510 | .66 | 15.1 | 229 | | 5.5 | 3.7 | 3.8 |

TABLE I

| Example | Total pore volume, cc./gm. | Compacted bulk Density, gms./cc. | micro pore Volume, cc./gm. | Surface area, m.²/gm. |
|---|---|---|---|---|
| 1 | 0.420 | 0.73 | 0.394 | 381 |
| 2 | 0.66 | 0.53 | 0.507 | 384 |

The increase in pore volume obtained by the process of the present invention are exhibited in Examples 4 and 5 compared to Example 3. An increase in micropore and surface area is also shown by the extrudate of Example 4. The extrudate of Example 5 was treated with additional activators in order to have the same weight of promoter per unit of volume in the extrudates of Examples 3 and 5. The extra use of promoter reduced the surface area of the extrudate of Example 5. Although the strength values of the extrudates of Examples 4 and 5 are less than that of Example 3, these values are suitable for use in fixed beds without fracture.

The extrudates of Examples 3 and 5 were tested for activity in hydrocracking test units employing standard test procedures. Activity was good for both samples. However, on the basis of the higher pore volume of the extrudate of Example 5 compared to that of Example 3, the extrudate of Example 5 can continue to be effective longer in a catalytic process wherein solid contaminants are present in the reacting materials that the extrudate of Example 3 before being inactivated by plugging. In addition, in view of the low density and high porosity of the extrudate of Example 5, it is possible to effect equivalent catalytic activity at lower weight use of catalytic material than with the extrudates of Example 3.

EXAMPLE 6

A portion of the extrudates produced in Example 3 after drying but before calcination were collected. These extrudates were ground to pass through an 80 mesh screen. The ground fines showed a loss of 23% upon ignition.

A 25 part portion of the filter cake recovered in Example 3 prior to treatment with promoters was mixed with 0.30 part of the ground fines obtained above. To this mixture was also added 0.69 part of kerosene containing 1% of the same surfactant employed in Example 1. After vigorous agitation of the mixture, it was processed into extrudates as in Example 1. The extrudates had pore volumes of .610 cc./gm. and crush strengths of 9.1 lbs. These extrudates were suitable for use in moving beds without fracture.

This example shows that the incorporation of fines in the catalyst material can be tolerated when the extrudate being formed has been modified with kerosene.

EXAMPLE 7

The process of Example 6 was repeated in every material detail except that the use of kerosene and surfactant was omitted. After calcination, the extrudates had completely disintegrated, leaving only fragmented particles.

This example shows that incorporation of fines in the catalyst material cannot be tolerated in the absence of kerosene modification.

EXAMPLES 8-19

In Example 8 the procedure of Example 5 was followed in every material detail except for the amount of kerosene and surfactant added. In the following examples, as indicated in Table III, the amount of kerosene was varied keeping the surfactant at 1% on the weight of the kerosene. In additional examples, No. 2 fuel oil was substituted for kerosene and used in the amounts indicated in Table III. The same surfactant at the same level was employed with the fuel oil as with kerosene. The catalyst materials were extruded as in Example 1 except that in several instances an extrusion nozzle having a 0.282 in. diameter orifice was also employed. Properties and petroleum fraction usage are given in Table III.

Examples 9 through 13, inclusive, show the increases in pore volume and surface area obtained with increasing usage of kerosene compared to Example 8, where no additive is used. Examples 14 through 16, inclusive, show similar effects with No. 2 fuel oil. It should be noted that in both cases the crush strength of the extrudates decreases to a minimum with a level of petroleum fraction of 0.6 lb. per lb. of catalyst material and then increases again above this level of usage. Example 17 shows that extrudates of a diameter of 0.1183 inch are not recovered as whole, unfragmented structures when the provision for petroleum fraction is not made. Examples 18 and 19 show that with the provision for petroleum fraction extrudates of this diameter and larger are recovered as whole, unfragmented structures.

EXAMPLE 20

The procedure of Example 4 was followed in every material detail except that in place of kerosene there was substituted an equal amount of heptane. The calcined extrudates did not possess materially improved pore volume or surface area since the heptane was volatilized before such improvements could be effected.

EXAMPLE 21

The procedure of Example 4 was followed in every material detail except that in place of kerosene there was substituted an equal volume of mineral oil. In this example the drying of the extrudate was by the staged technique, wherein in the first stage the moisture content of the extrudates was reduced to about one-half, i.e., from 93.1% to about 46.5%. In a second stage the moisture content was further reduced as far as the temperature, 150° F. would permit, 28% moisture.

The extrudates obtained after calcination had essentially the same properties as those of Example 2. Although suitable catalyst materials of increased pore volume and surface area are produced using mineral oil as the petroleum fraction, it is essential to insure success that staged drying be employed to avoid exudation of the mineral oil from the extrudate during drying and thereby obtain the desired improvements in pore volume and surface area. In the absence of such drying technique, fragmented catalyst and high proportions of fines are obtained.

What is claimed is:

1. A process for preparing formed catalyst particles which comprises preparing a slurry of an inorganic oxide hydrogel such that a continuous water phase is present, adding to said slurry a petroleum fraction having a boiling range between about 300 and 950° F. subjecting said modified slurry to sufficient shearing action to eliminate the fluidizing effect of the continuous water phase thereby forming a stiffened hydrogel, extruding the stiffened hydrogel through an orifice of from $\frac{1}{16}$ to $\frac{1}{2}$ inch diameter, and drying and calcining said extrudate.

2. The process of claim 1 in which an oil-in-water emulsion of the hydrogel slurry and petroleum fraction is formed prior to being subjected to the shearing action.

3. The process of claim 1 wherein the petroleum fraction is kerosene.

4. The process of claim 1 wherein the petroleum fraction is No. 2 fuel oil.

5. The process of claim 1 in which the inorganic oxide hydrogel is an alumina-coated silica hydrogel.

6. The process of claim 5 wherein the petroleum fraction is employed at a level of 0.3 to 1.2 pounds per pound of alumina-coated silica based on the calcined weight of the latter.

7. The process of claim 1 wherein the drying is effected in stages.

8. The process of claim 1 wherein fines from previous catalyst preparations are added to the hydrogel slurry.

TABLE III

| Example No. | Additive Type | Level, lb./lb. catalyst | Total pore volume, cc./g. | Micro pore volume, cc./g. | Diam., in. | Crush strength, lbs. | Crush Strength per unit of length, lbs. per in. | Surface area, m²./g. | Observations |
|---|---|---|---|---|---|---|---|---|---|
| 8 |  | 0 | .370 | .306 | .0636 | 35 | 221 | 314 |  |
| 9 | Kerosene | 0.1 | .485 | .375 | .0683 | 23 | 147 | 332 |  |
| 10 | do | 0.2 | .510 | .373 | .0682 | 18 | 114 | 351 |  |
| 11 | do | 0.3 | .580 | .373 | .0708 | 19 | 118 | 365 |  |
| 12 | do | 0.6 | .710 | .429 | .0711 | 11 | 68 | 349 |  |
| 13 | do | 1.2 | .810 | .505 | .0701 | 21 | 136 | 377 |  |
| 14 | Fuel oil | 0.1 | .450 |  | .0677 | 26 | 168 | 318 |  |
| 15 | do | 0.3 | .610 |  | .0702 | 14 | 88 | 345 |  |
| 16 | do | 1.2 | .810 |  | .0731 | 16 | 105 | 380 |  |
| 17 |  | 0 | .370 |  | .1183 |  |  |  | Primarily fines and fragments. |
| 18 | Fuel oil | 0.3 | .610 |  | .1303 | 53 | 211 |  | No fractured extrudates or fines. |
| 19 | Kerosene | 0.3 | .560 |  | .1306 | 38 | 151 |  | No fractured extrudates or fines. |

9. A catalyst material produced in accordance with claim 1.

10. A catalyst material produced in accordance with claim 6.

References Cited

UNITED STATES PATENTS

| 2,503,913 | 4/1950 | Kimberlin et al. | 252—448 |
| 2,831,652 | 4/1958 | Gemperle et al. | 252—448 |
| 3,004,292 | 10/1961 | Folkins et al. | 252—451 X |
| 3,067,128 | 12/1962 | Kimberlin et al. | 208—138 |
| 3,154,603 | 10/1964 | Witheford et al. | 252—448 |
| 3,390,100 | 6/1968 | Chomitz et al. | 252—455 |

DANIEL E. WYMAN, Primary Examiner

C. F. DEES, Assistant Examiner

U.S. Cl. X.R.

252—448, 455